March 11, 1958 — C. E. STOWE — 2,826,263
AIR FILTERING APPARATUS
Filed Feb. 1, 1955
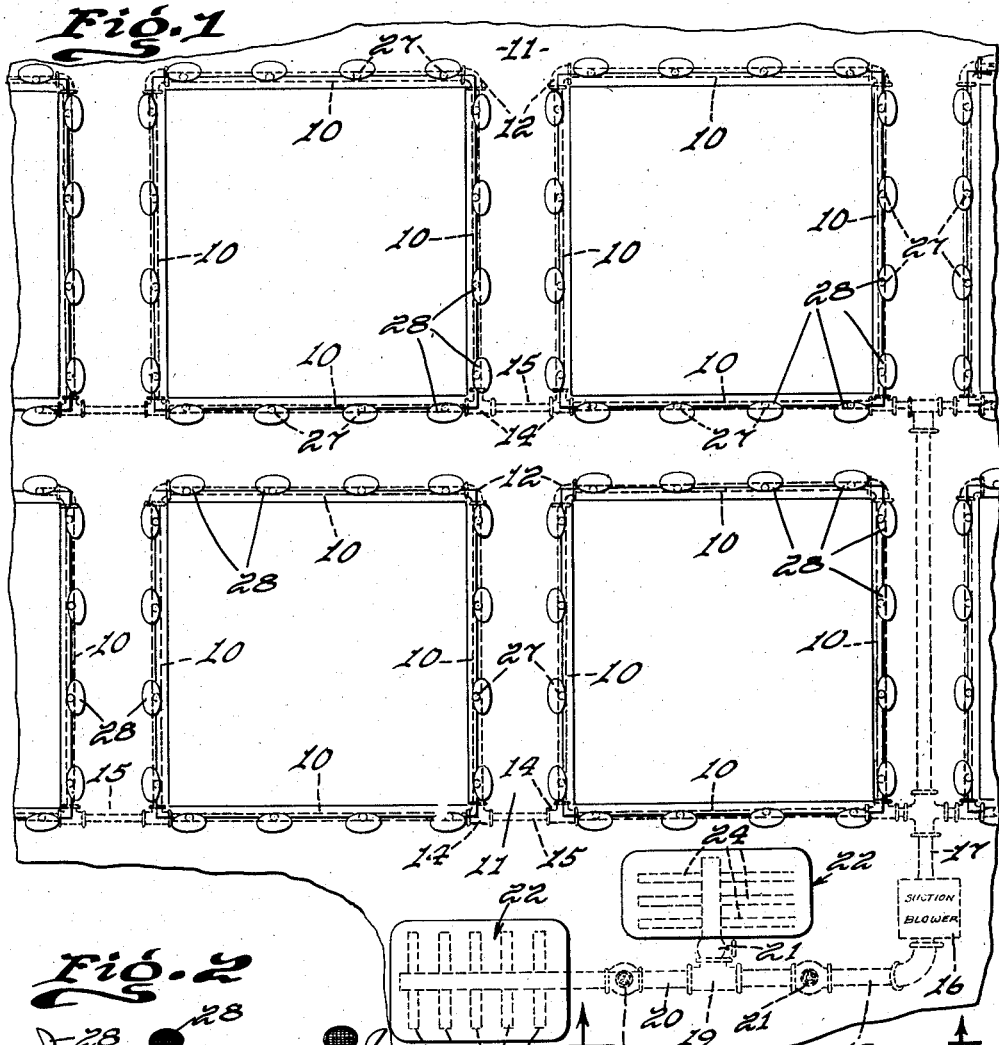
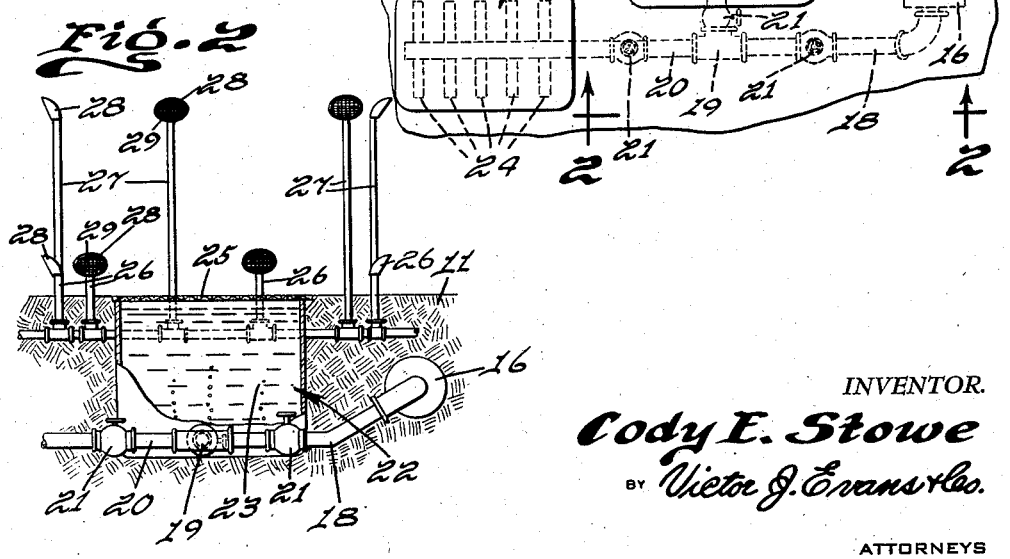
INVENTOR.
Cody E. Stowe
BY Victor J. Evans & Co.
ATTORNEYS

2,826,263

AIR FILTERING APPARATUS

Cody Elias Stowe, Redding, Calif.

Application February 1, 1955, Serial No. 485,425

1 Claim. (Cl. 183—14)

This invention relates to an air filtering apparatus, and more particularly to an apparatus for purifying contaminated air in cities or the like.

The object of the invention is to provide an air filtering apparatus which will effectively remove foreign matter or contamination from air in cities and the like.

Another object of the invention is to provide an air filter assembly which includes a plurality of conduits that have pipes extending upwardly therefrom whereby contaminated air which may contain smog, fumes, or other material therein will be sucked in through the pipes and conduits and then this contaminated air will be passed through reservoirs holding liquids such as water or the like so that the foreign matter will be filtered out of the air whereby the purified air can be returned to the atmosphere.

A further object of the invention is to provide an air filtering apparatus which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary top plan view illustrating the present invention.

Figure 2 is a sectional view taken on the line 2—2 of Figure 1.

Referring in detail to the drawings, the numeral 10 designates each of a plurality of conduits which are adapted to be embedded in the ground or positioned below a street or sidewalk 11, Figure 1. Certain of the conduits 10 may be interconnected together by means of elbows 12, and the conduits 10 may be arranged in rectangular formation and each rectangular shaped group of conduits 10 may be interconnected together by means of conduits 15 which are arranged in engagement with fittings 14.

A suction blower 16 of conventional construction may also be positioned below the street or ground 11 and a conduit 17 serves to connect the suction blower 16 to the various conduits 10. An outlet conduit 18 may be connected to the suction blower 16, and the conduit 18 may lead to a fitting 19.

Branch lines 20 may lead from the fitting 19, and manually operable valves 21 may be positioned in the lines 20.

There is further provided a plurality of reservoirs or chambers 22 which may each have a quantity of fluid or liquid therein such as water 23. Conduit sections 24 may extend outwardly from the branch lines 20 so that the contaminated air will discharge below the water level 23 so that the sediment or foreign matter in the air will be removed by the water 23 whereby the purified air can be returned to the atmosphere. A screen or reticulated member 25 may extend across the top of each reservoir 22 for helping to further remove foreign matter from the air.

There is further provided a plurality of vertically disposed spaced parallel pipes 26 and pipes 27 and the pipes 27 may be of greater height than the pipes 26. A head or cap 28 may be arranged on the upper end of each head 28, and each head 28 may be provided with an opening 29 which faces downwardly so that rain or snow will not accidentally enter the openings 29. Thus, the air to be purified will be sucked in through the openings 29 then pass down through the pipes 26 or 27, and then pass through the conduits 10 and then pass through the conduits 17. The suction blower 16 creates the necessary suction for causing the air to travel in this manner and the contaminated air is then discharged out through the conduit 18 and then enters the reservoirs 22 through the conduits 24. The contaminated air will give up some of its foreign matter due to the provision of the water 23 and the purified air will then pass up through the reticulated member 25 and will be returned to the atmosphere so that persons breathing in the atmosphere or air will not be made uncomfortable or harmed.

From the foregoing it is apparent that there has been provided a method of and apparatus for use in purifying air in cities or the like. In use the suction blower 16 is actuated by any suitable mechanism, as for example by means of a motor, whereby the contaminated air will be sucked in through the heads 28 and then pass down through the pipes 27 or 26. This air will then pass through the conduits 10 and be discharged through the branch lines 24 into the bottom of the reservoirs 22. The water or other absorbing fluid 23 will remove the contaminated material so that pure clean air will be discharged up through the reticulated screen 25. The pipes 27 are higher than the pipes 26 so that the pipes 26 may act as a means for the passage therethrough of fumes from automobiles and the like. The higher pipes 27 may have fumes from trucks and the like pass therethrough since the exhaust pipes of trucks are higher than those of automobiles.

The present invention is especially suitable for use in removing fumes, smog, and fog from localities where such contaminants are present. Other liquids besides water can be used in the reservoirs 22 to remove the foreign matter. The conduits can be laid in any suitable locality as for example they can be positioned below streets or sidewalks. The branch lines 24 may be provided with a plurality of apertures through which the air can pass. The present invention is also adapted to be used for purifying air that results from furnaces or burners since such furnaces could be connected to the suction blower 16. Due to the provision of the valves 21, the passage of air to any of the various reservoirs 22 can be cut-off as when the reservoirs are to be drained for cleaning purposes. The number of conduits or pipes as well as the size thereof can be varied as desired. The openings in the heads 28 are arranged on the lower side of the head so that rain will not accidentally enter the system.

I claim:

In an air filtering apparatus for removing foreign matter or contamination such as smog, fumes and other material from air in cities or the like, a plurality of horizontally disposed conduits adapted to be embedded below the ground level so as to prevent formation of an unsightly appearance, certain of said conduits being interconnected together by means of elbows, said conduits being arranged in rectangular formation and each rectangular group of conduits being interconnected together by means of other conduits which are arranged in engagement with fittings, a plurality of vertically disposed spaced parallel pipes extending upwardly from said conduits, said pipes being of different heights whereby fumes from different types and sizes of vehicles can be treated, a suction blower connected to said conduits and positioned below the ground level, a plurality of reservoirs spaced from said blower and adapted to hold a quantity of fluid, conduit means connecting said blower to said reservoirs whereby the contaminated air will discharge below the water level so that sediment or foreign matter in the air will be removed by the water whereby the purified air can be returned to the atmosphere, manually operable valves in said last named conduit means for controlling the flow of material to said reservoir, a reticulated member extending across each of said reservoirs for helping to further remove foreign material from the air, said reticulated members being flush with the level of ground, an inclined head mounted on the upper end of each of said pipes, each of said heads having an opening facing downwardly so that rain or snow will not accidentally enter the openings, the suction blower causing the contaminated air to be sucked in through the openings in said heads and whereby this air will be discharged into the fluid in said reservoirs so that the fluid will remove the contaminated material so that pure clean air will be discharged up through the reticulated members.

References Cited in the file of this patent

UNITED STATES PATENTS

| | | |
|---|---|---|
| 1,051,956 | Jacobs et al. | Feb. 4, 1913 |
| 1,182,260 | Fleming | May 9, 1916 |
| 1,278,937 | Johnson | Sept. 17, 1918 |
| 1,653,454 | Frattallone | Dec. 20, 1927 |
| 1,698,679 | Gerken | Jan. 8, 1929 |
| 1,908,030 | Larson | May 9, 1933 |
| 2,040,941 | Jones et al. | May 19, 1936 |
| 2,713,476 | Steichen | July 19, 1955 |